United States Patent [19]
Ohashi et al.

[11] Patent Number: 5,694,294
[45] Date of Patent: Dec. 2, 1997

[54] PORTABLE COMPUTER WITH FAN MOVING AIR FROM A FIRST SPACE CREATED BETWEEN A KEYBOARD AND A FIRST CIRCUIT BOARD AND A SECOND SPACE CREATED BETWEEN THE FIRST CIRCUIT BOARD AND A SECOND CIRCUIT BOARD

[75] Inventors: Shigeo Ohashi, Tsuchiura; Tadakatsu Nakajima, Ibaraki-ken; Yoshihiro Kondo, Ibaraki-ken; Mitsuru Honma, Ibaraki-ken; Kenji Onishi, Hadano; Hiroshi Tsuzaki, Owariasahi; Hitoshi Matsushima, Ryuugasaki, all of Japan

[73] Assignee: Hitachi, Ltd., Tokyo, Japan

[21] Appl. No.: 593,049

[22] Filed: Jan. 29, 1996

[30] Foreign Application Priority Data

Jan. 27, 1995 [JP] Japan .................... 7-011288

[51] Int. Cl.[6] .................... G06F 1/20; H05K 7/20
[52] U.S. Cl. .................... 361/687; 361/695
[58] Field of Search .................... 364/708.1; 361/680, 361/687, 688, 692–695

[56] References Cited

U.S. PATENT DOCUMENTS 5,400,213 3/1995 Honda et al. .................... 361/680

FOREIGN PATENT DOCUMENTS 5-304379 11/1993 Japan .

Primary Examiner—Michael W. Phillips
Attorney, Agent, or Firm—Antonelli, Terry, Stout & Kraus, LLP.

[57] ABSTRACT

In a portable personal computer in which high-exothermic devices are mounted within a flat case equipped with an input unit, the and in which a surface temperature of the exothermic devices and the input unit is cooled down to or below a predetermined temperature. A first space is created between the back of a keyboard operating section and an electronic circuit board 3, the electronic circuit board 3 is installed so that the face thereof on which the high-exothermic devices are mounted faces away from the back of the keyboard, a second space is created between the electronic circuit board 3 and an electronic circuit board 2, and a fan 4 is installed inside the case so that cooling air flows from the first space to the second space. A flow path for circulating outside air into the case via an air intake hole 8 is constructed on the wall of the input device operating section.

21 Claims, 4 Drawing Sheets 5,694,294

PORTABLE COMPUTER WITH FAN MOVING AIR FROM A FIRST SPACE CREATED BETWEEN A KEYBOARD AND A FIRST CIRCUIT BOARD AND A SECOND SPACE CREATED BETWEEN THE FIRST CIRCUIT BOARD AND A SECOND CIRCUIT BOARD

BACKGROUND OF THE INVENTION

The present invention relates to a portable (note book type) electronic DEVICE and more particularly to the cooling of such a device.

Recently, the processing speed of a microprocessor, which represents the main arithmetic device of a computer, has been remarkably increased, and the size thereof has been also miniaturized. Thus, it has become possible to execute operations which had to be carried out by a large computer in the past using a small computer. Further, a portable personal computer, called a note-type/book-type computer, in which such small and high-speed microprocessors are mounted and which can be carried in a brief case, has become popular.

However, the microprocessor which carries out such high-speed operations has a problem in that it generates a large amount of heat. In order to cool such devices, a fan is provided so that cooling air directly impacts on exothermic devices, as described in Japanese Patent Laid-Open No. Hei. 5-304379 (hereinafter called the publication) for example.

Because it is necessary to reduce the thickness of the case of such a personal computer so as to be able to easily carry it around, it is constructed with an electronic circuit board on which a plurality of semiconductor devices, including the microprocessor, are mounted; memory units, such as a writing/reading unit, of a hard disk and/or a floppy disk are mounted in the main case; and these units are covered by a keyboard and palm-rest. Then, a display unit (which is typically composed of a liquid crystal type display because it is required to be thin) is formed as part of a cover of the case at a position where it faces the surface of the keyboard when the cover is closed.

When the exothermic microprocessor as described above is mounted in such a personal computer, according to the technology described in the above-mentioned publication, a fan is built within the flat case and the devices are merely cooled by the fan disposed in the vicinity of the microprocessor. Due to this arrangement, there has been a problem in that the heat generated by the microprocessor warms up the members which an operator touches, such as the keyboard and the palm-rest, thus giving an unpleasant feeling to the operator.

SUMMARY OF THE INVENTION

Accordingly, it is a primary object of the present invention is to cool devices mounted in a portable personal computer and to keep the surface of parts which are touched by the operator around a temperature which is not unpleasant to the operator.

It is another object of the present invention to keep the personal computer thin while achieving the above-mentioned object.

The above-mentioned object may be achieved by a personal computer comprising input means provided on a surface of a case and electronic circuit boards on which a plurality of semiconductor devices are mounted and which are provided within the case; and including: a first space defined in part by a back portion of the input means; a second space containing semiconductor devices to be cooled among the plurality of semiconductor devices; an air intake hole formed in the case for communicating the first space with the outside of the case; an exhaust hole formed in the case for communicating the second space with the outside of the case; and cooling means for causing air taken in from the intake hole to flow so that it is exhausted from the exhaust hole via the first space and the second space.

The other object described above may be achieved by using an axial flow fan as the cooling means and by mounting the fan for causing air flow from the first space to the second space so that the angle of the axis of rotation thereof is equal to or smaller than a vertical angle with respect to the bottom of the case, but is not parallel to the bottom of the case.

The above and other related objects and features of the present invention will be apparent from a reading of the following description of the disclosure with reference to the accompanying drawings, and the novelty thereof will be pointed out in the appended claims.

DETAILED DESCRIPTION OF PREFERRED EMBODIMENTS

Figure 1:
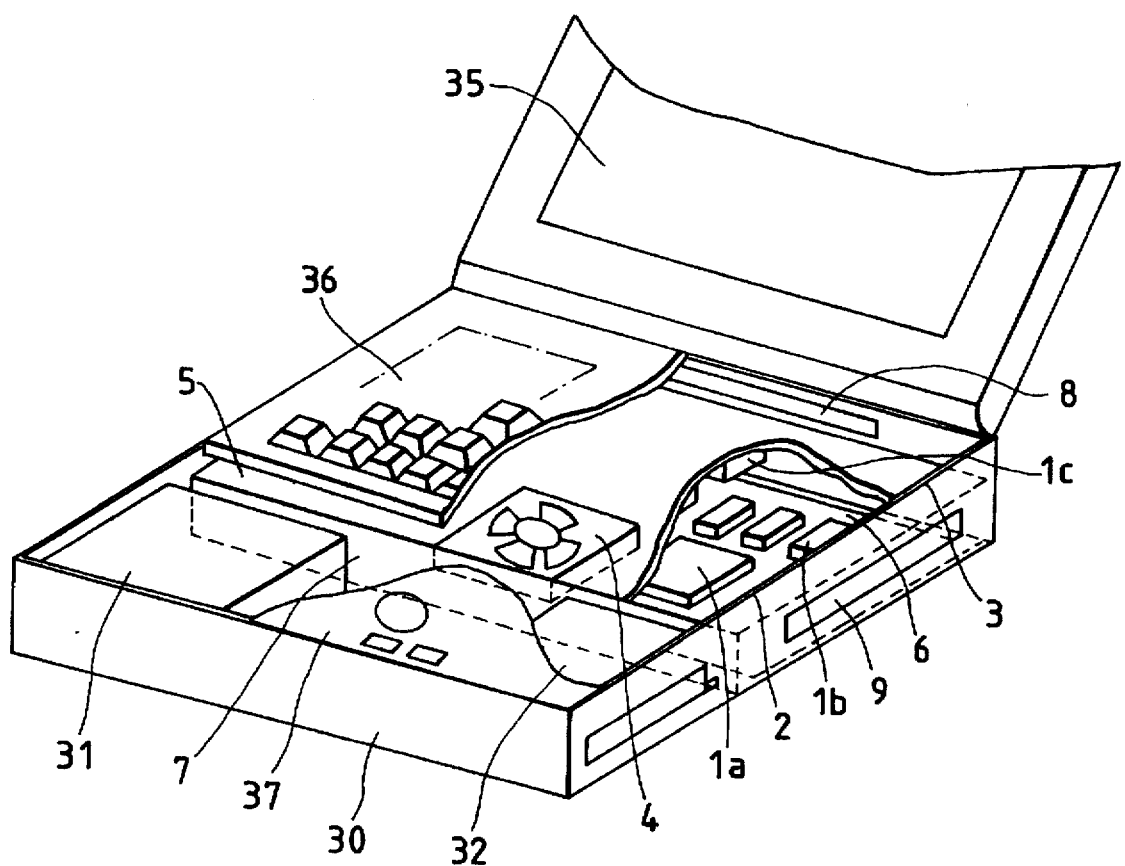
FIG. 1 is a partially cut-away perspective view of a personal computer according to one embodiment of the present invention.

One preferred embodiment of the present invention will be explained with reference to FIGS. 1 through 4. As shown in FIG. 1, a personal computer (a concept of which includes a word-processor and a portable electronic pocket notebook in this specification) comprises a plurality of electronic circuit boards 2 and 3 on which are mounted a plurality of electronic devices including a microprocessor 1a, a cache memory 1b, a graphic control device 1c and other semiconductor devices; a hard disk 31; a floppy disk read/writing unit 32; a fan 4; and components which are housed in a case 30. A liquid crystal display 35 is disposed on a cover of the case 30. A keyboard 36 and a palm rest 37, serving as input means, are disposed on the upper part of the case 30 when the cover is opened.

Figure 2:
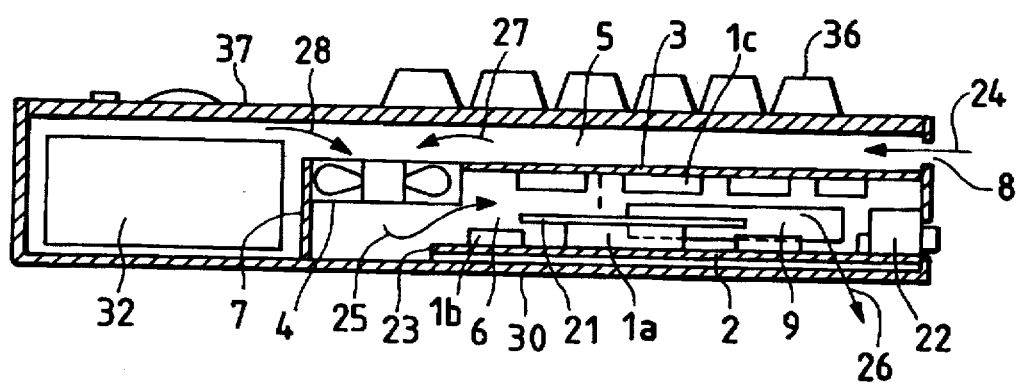
FIG. 2 is a longitudinal sectional view of the personal computer shown in FIG. 1.

As it is apparent from FIG. 2, a space (gap) is created between the electronic circuit board 3 and the keyboard 36 representing a first space 5. Another space (gap) is created between the electronic circuit boards 2 and 3 representing a second space 6. Because the microprocessor 1a mounted on the electronic circuit board 2 is highly integrated so as to be capable of an increased processing speed, it generates a large amount of heat during its operation. Because the cache memory 1b is connected to the microprocessor 1a and its operation speed is also fast so as to follow the high-speed microprocessor 1a, it also generates a large amount of heat. The graphic control device 1c also generates heat since it also is required to operate at high-speed. Those semiconductor devices 1a, 1b and 1c generating large amounts of heat will be referred to as high-exothermic devices in general hereinafter. Then, as is apparent from FIG. 2, the electronic circuit boards 2 and 3 are installed so that the surfaces on which those high-exothermic devices are mounted face each other across the second space 6.

The axial flow fan 4 is mounted where part of the electronic circuit board 3 is cut away and is installed so that the suction side faces the first space 5 and the exhaust side faces the second space 6. The first space 5 is provided with an air intake hole 8 at the rear face of the case 30 and the second space 6 is provided with an exhaust hole 9 for discharging the air inside the case on the side of the case 30. The second space 6 is separated from the first space 5 by a partition wall 7 and the electronic circuit board 3 in order to assure a flow path of air taken into the first space 5, which flows to the second space 6 via the axial flow fan 4 and is discharged outside. Accordingly, no strict airtight seal is necessary.

The cooling mechanism of this embodiment will be explained below. The electronic circuit board 2 is equipped with a connector 22 for inputting/outputting signals. The microprocessor 1a, which is mounted on the electronic circuit board 2 and is a semiconductor device which generates a particularly large amount of heat, has attached thereto a plate-like fin 21 in correspondence with the amount of heat to be generated. A weather-strip 23 is provided between the end portion of the electronic circuit board 2 around the center of the case 30 and the case 30 so that air flowing out of the axial flow fan 4 will not enter a gap between them, thereby ensuring that all of the air will flow to the devices to be cooled.

The axial flow fan 4 is installed so that the direction of the axis of rotation thereof becomes parallel or approximately parallel with a thickness direction of the case. That is, if the fan 4 is installed so that the direction of the axis of rotation thereof becomes parallel with the depth direction of the case 30, the thickness of the case 30 will be influenced by the diameter of the fan 4, causing a problem that the miniaturization (thinning) of the personal computer is hampered by such cooling structure. Thus, the fan 4 is installed as described above in the present embodiment. It is noted that the fan 4 may be installed aslant when it can be stored within the space of the case 30 where there is enough room in the thickness direction thereof, though it is most suitable to install the fan 4 in parallel or approximately parallel with the thickness direction of the case 30 in order to provide a thin personal computer.

Next, the flow of the cooling air in the present embodiment will be explained. Because the fan 4 is installed so that the suction side thereof faces the first space 5 between the input unit operating section (keyboard 36) and the electronic circuit board 3, as described above, outside air 24 which is cooler than an air inside the case 30 flows into the first space 5 from the intake hole 8. At this time, not all of the outside air from the intake hole 8 is suctioned directly by the fan 4. That is, part of the incoming air is suctioned by the fan 4 after circulating around almost all the area of the back of the keyboard 36 and the palm rest 37. Thus, the cooling air flowing out of the fan 4 enters the second space 6, cools the devices disposed so as to face each other across the second space 6 and is discharged via the exhaust hole 9. When no cooling air flows, heat generated by the high-exothermic devices warms up the electronic circuit board 3 and reaches the back of the keyboard 36 in the form of infrared rays via the first space 5. Thereby, the temperature of the keyboard 36 and the palm rest 37 rises, giving an unpleasant feeling when the operator touches them. When the air flows by activating the fan 4, the back of the keyboard 36 and the palm rest 37 and the back of the electronic circuit board 3 are cooled by the outside air in the first space 5. Because the surface of the electronic circuit board 3 on which the graphic control device 1c, which generates a relatively large amount of heat, is mounted so as to face the second space 6, not the first space 5, the temperature of the keyboard 36 may be suppressed from rising. Further, even if an exothermic unit, such as the disk unit 32, which generates a smaller amount of heat as compared to the electronic circuit boards 2 and 3, is disposed below the palm rest 37, the temperature of the palm rest 37 may be also suppressed from rising because the air flows around the disk unit 32, as shown by arrow 28, due to the fan 4. It is noted that devices, such as a memory and a capacitor, which generate relatively less heat, other than the high-exothermic devices described above, may be mounted on the side of the electronic circuit board 3 facing the first space 5.

Meanwhile, because the high-exothermic devices 1a, 1b and 1c are disposed adjacent the exhaust side of the fan 4 and the blown-out air 25 will not enter the gap between the electronic circuit board 2 and the case 30, the air blown out of the fan 4 is guided effectively to the section occupied by the exothermic devices and cools them. At this time, because the exhaust side space and the suction side space of the fan 4 are briefly hermetically separated and the exhaust hole 9 and the intake hole 8 are provided at different faces of the case 30, the exhaust air 26 whose temperature has risen will not return to the suction side of the fan 4, thus achieving an efficient cooling. Further, because the fan 4 is installed so that the direction of the axis of rotation thereof is parallel or approximately parallel with the thickness direction of the case 30, it is possible to mount a fan having blades whose diameter is greater than the thickness of the case 30, and it becomes possible even to deal with a situation in which a device which generates a large amount of heat is present by increasing the diameter of the blades of the fan to be used. As a result, it becomes possible to cool the exothermic devices and other exothermic members within the case 30 at or below a predetermined temperature and to keep the surface of the input units, such as the keyboard 36 and the palm rest 37 which the operator touches, at or below a temperature which will not give an unpleasant feeling to the operator.

While an arrangement has been described wherein the semiconductor devices to be cooled are cooled without increasing the temperature of the keyboard 36 and the palm rest 37 while keeping the case thin, an arrangement by which the semiconductor devices to be cooled are cooled more efficiently will be explained with reference to FIGS. 3 and 4.

Figure 3:
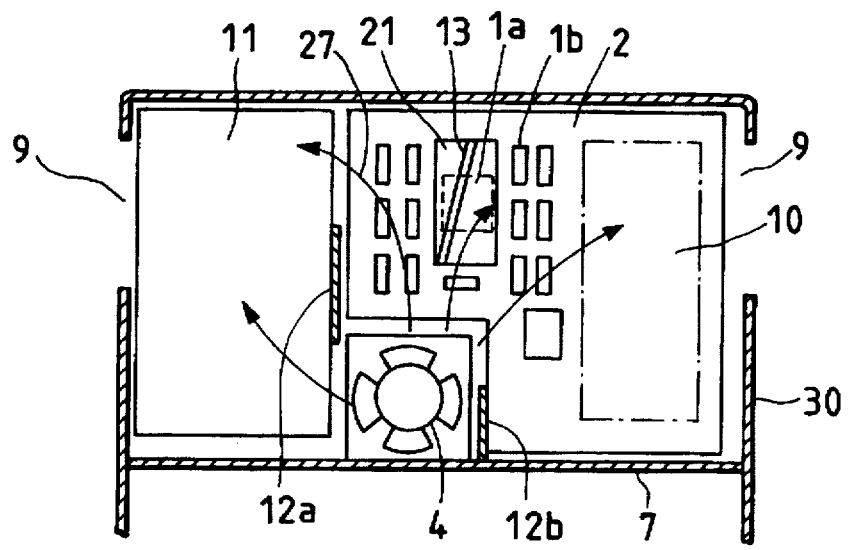
FIG. 3 is a transverse sectional view of the personal computer shown in FIG. 1.
Figure 4:
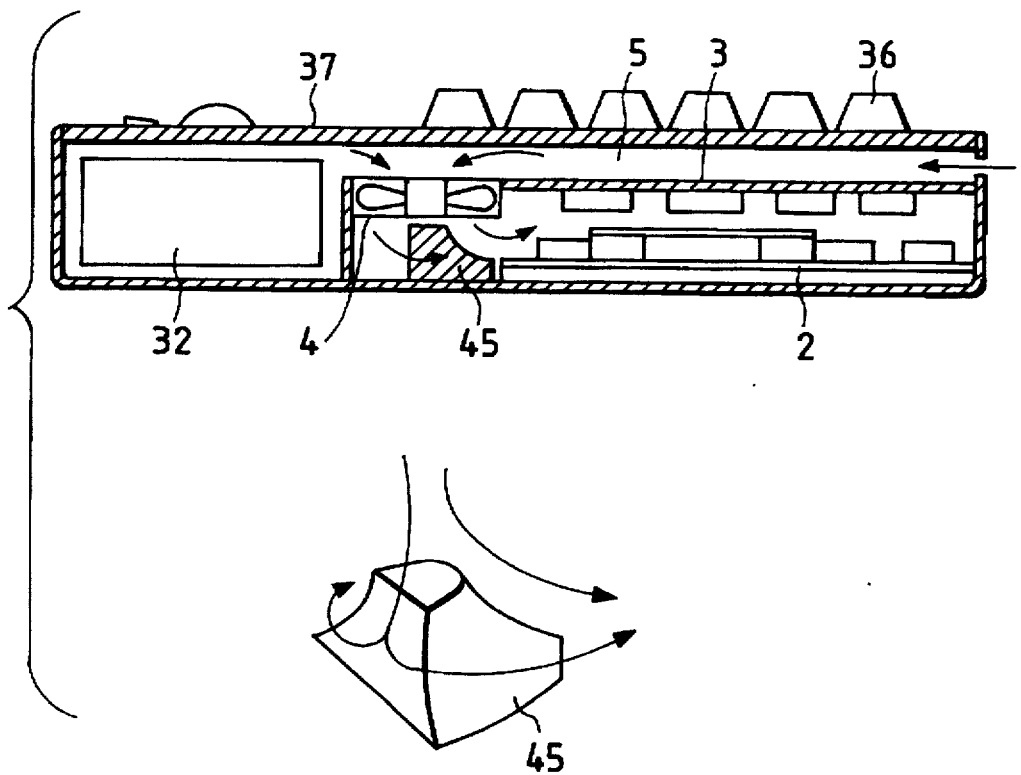
FIG. 4 is a longitudinal sectional view of the personal computer shown in FIG. 3.

FIG. 3 shows a transverse sectional view of the personal computer of the present embodiment. In this figure, the second space 6 shown in FIG. 2 is enlarged. In this embodiment, the plurality of high-exothermic devices, i.e. the microprocessor 1a and the cache memory 1b, are disposed in the vicinity of the fan 4. The devices and units which generate less heat are disposed in an area 10 relatively separated from the fan 4. A power circuit board 11 also is installed within the second space 6. Further, plate members 12a and 12b having a certain height in the direction transverse to the surface of the drawing are installed in correspondence with the layout of the exothermic devices mounted on the electronic circuit board 2, so that a flow path of cooling air is formed within the second space 6. These plate members 12a and 12b regulate the flow of air within the second space 6. Because the high-exothermic devices and the power circuit board 11 described above should be cooled by the cooling air, more air should flow to them. According to the present embodiment, the air which has been flows out of the fan 4 and which flows in the direction of the power circuit board 11 is distributed to the side of the exothermic devices, as indicated by arrow 27, by the plate member 12a and the air which flows to the area 10 on the right side of the fan 4 in FIG. 3 in which no high-exothermic devices are mounted is restricted by the plate member 12b. By regulating the flows of air within the second space 6 as described above, the air flowing out of the fan 4 is guided effectively and selectively to the area where the high-exothermic devices are mounted. Further, it becomes possible to regulate the air flow direction similarly to the plate members 12a and 12b by bonding a plate member 13, having a predetermined height in the direction transverse to the surface of the drawing, to the plate-like fin 21 attached to the microprocessor 1a, or by providing it in a body with the fin 21 with an adequate attachment angle with respect to the end face of the fin 21. Further, the cooling effect of the exothermic device 1a may be enhanced by forming the plate member 13 of the same material as the fin 21 or with a metal having a high thermal conductivity.

By the way, the cooling air flowing out of the fan 4 cools the inside of the second space 6 after directly hitting the bottom face of the second space 6. That is, because it flows in the horizontal direction after hitting the bottom once, the flow resistance thereof is increased. Thus, as shown in FIG. 4 (the exhaust hole 9 is omitted here), a skirt-like member 45 is provided under the fan 4, which allows a pressure drop at the fan exhaust port to be decreased and the air flow amount of the fan 4 to be increased. As a result, the cooling performance in the second space 6 is enhanced. It is noted that, needless to say, the skirt-like member 45 is to be provided when there is enough room within the case, and it need not be provided when there is no room. Further, although the skirt-like member 45 is provided at the downstream side below the fan in the present embodiment, it may be provided around the whole circumference below the fan depending on the shape of the section where the fan is installed.

Figure 5:
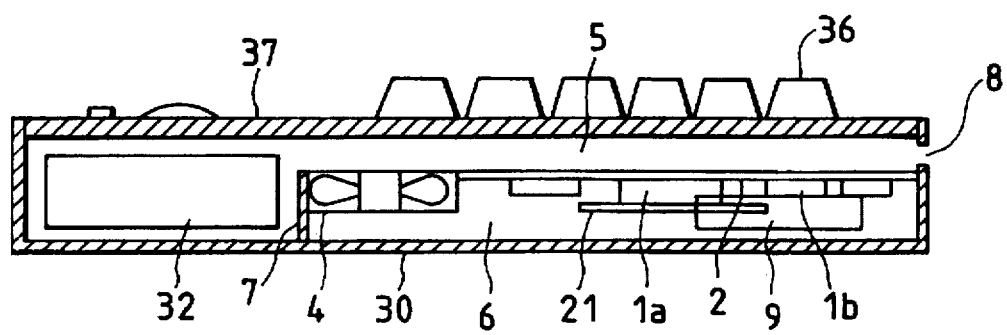
FIG. 5 is a longitudinal sectional view of the personal computer shown in FIG. 1 having one electronic circuit board.

Next, a case will be explained in which one electronic circuit board will be sufficient for the semiconductor devices used for the personal computer where the components are highly integrated or functions of the personal computer are decreased. As shown in FIG. 5, the personal computer of this embodiment is constructed in the same way as the embodiment shown in FIGS. 1 and 2, except that it includes only one electronic circuit board 2. A gap is created between the electronic circuit board 2 and the keyboard 36 representing a first space 5 and another gap is created between the electronic circuit board 2 and the case 30 representing a second space 6. Here, the electronic circuit board 2 is installed so that the face on which the microprocessor 1a and the cache memory 1b, i.e. the semiconductor devices which generate a particularly large amount of heat, are mounted to face away from the keyboard 36 in order to avoid problems such as the need for a new partition for separating the first space 5 and the second space 6, as would be necessary if the electronic circuit board 2 is disposed on the bottom of the case, and the possibility that the heat generated by the high-exothermic devices readily reaches the keyboard 36. In other words, this embodiment provides the advantages that the board itself plays the role of a partition and that the keyboard 36 is not warmed up so much since infrared rays are radiated toward the bottom of the case by disposing the electronic circuit board 2 so that it faces the bottom of the case. Further, the fan 4 is installed within the case 30 so that the suction side thereof is opened to the first space 5 and the exhaust side is opened to the second space 6, respectively. Herein the second space 6 facing the exhaust side of the fan 4 is briefly hermetically separated from the first space 5 by a partition wall 7 and the electronic circuit board 2 itself. The microprocessor 1a mounted on the electronic circuit board 2 is attached with a plate-like fan 21 in accordance to the heat to be generated. The fan 4 is installed so that the direction of the axis of rotation thereof becomes parallel or approximately parallel within the thickness direction of the case 30. The temperature of the keyboard 36 may be suppressed from rising also in this embodiment because the cold outside air flowing into the case 30 via the intake hole 8 flows through the first space 5 via the back of the keyboard 6, and the face of the electronic circuit board 2 on which the high-exothermic devices 1a and 1b are mounted is not facing this flow path. Further, the temperature of the palm rest 37 may be also suppressed from rising even when an exothermic unit such as the disk unit 32 is disposed below the palm rest 37, because an air flow is created also around the disk unit 32 by the fan 4.

It is noted that devices which generate less heat as compared to the microprocessor 1a and the cache memory 1b may be mounted on the face of the electronic circuit board 2 which faces the first space 5 as described before. Meanwhile, because the high-exothermic devices 1a and 1b are disposed at the downstream end of the exhaust air path, indicated by the arrow 25, and are not separated so much from the fan 4, they are cooled fully. Accordingly, the exothermic devices and other exothermic members within the case 30 may be cooled down to or below a predetermined temperature and the surface temperature of the input units, such as the keyboard 36 and the palm rest 37 which the operator touches, may be kept at a temperature which will not give an unpleasant feeling to the operator.

As described above, according to the present embodiment, the temperature of the parts such as the keyboard which the operator touches can be suppressed from rising and the high-exothermic devices can be effectively cooled while realizing a thin personal computer.

Figure 6:
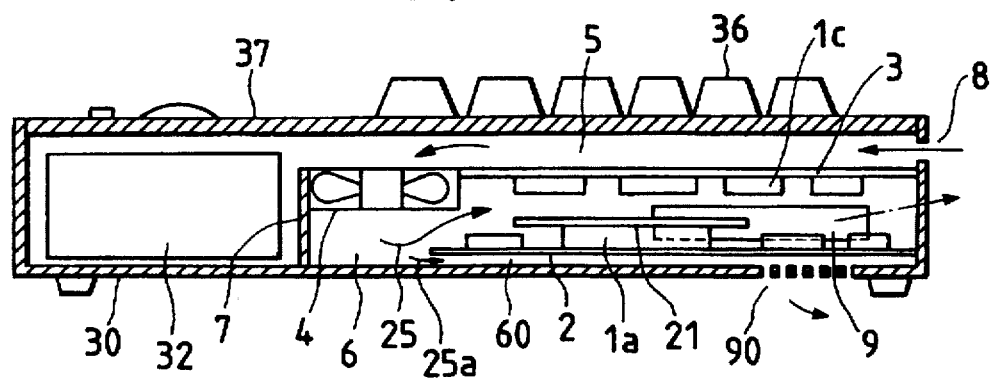
FIG. 6 is a longitudinal sectional view of a personal computer according to another embodiment of the present invention.

A second embodiment of the present invention will be explained with reference to FIG. 6. This embodiment is different from the embodiment shown in FIG. 2 in that the electronic circuit board 2 is installed so that a space 60 is created between the electronic circuit board 2 and the case 30 and an exhaust hole 90 is provided at the bottom of the case 30. Part of the air flowing out of the fan 4 to the second space 6 flows also to the gap 60 between the electronic circuit board 2 and the case 30, as indicated by arrow 25a, and is discharged outside of the case via the exhaust hole 90.

Thereby, there is an effect, in addition to those in the first embodiment, that the bottom of the case 30 will not be warmed up and the operator will not feel any unpleasant feeling even if the operator operates the personal computer while it is resting on his knees. However, in this case, the air amount for cooling the high-exothermic devices decreases more or less.

Figure 7:
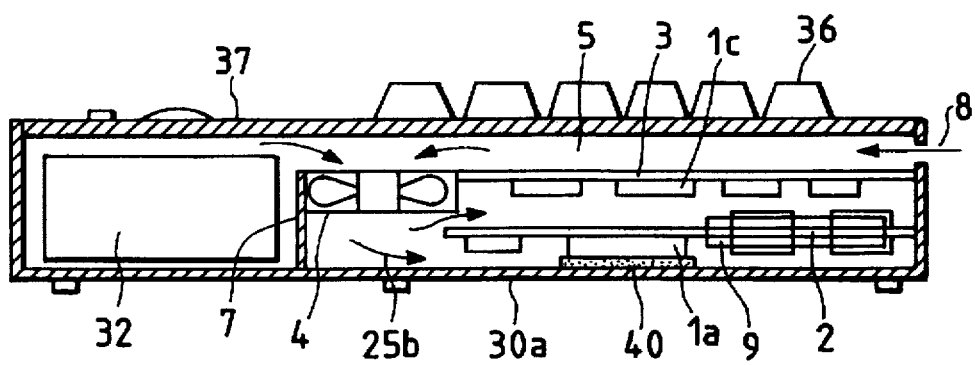
FIG. 7 is a longitudinal sectional view of a personal computer according to another embodiment of the present invention.
Figure 8:
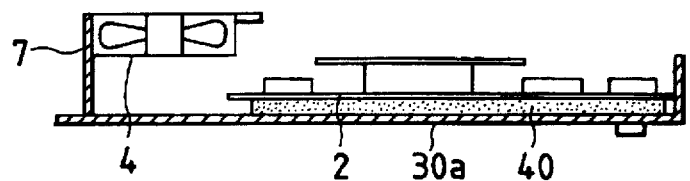
FIG. 8 is a longitudinal sectional view of a personal computer according to the present invention.

A third embodiment of the present invention will be explained with reference to FIGS. 7 and 8. FIG. 7 is a longitudinal sectional view of a personal computer according to the third embodiment and FIG. 8 is a partially enlarged longitudinal sectional view showing a modified example of FIG. 7. This embodiment is different from the embodiment shown in FIGS. 1 and 2 in that the electronic circuit board 2 is installed so that the face thereof on which the high-exothermic device 1a is mounted faces a bottom face 30a of the case and a soft member 40 having a high thermal conductivity is interposed between the high-exothermic device 1a and the bottom 30a of the case. This soft member 40 is made of a thermal compound which is charged into a film formed like a bag or of is made a gel Si having a high thermal conductivity. Although FIG. 7 shows a case in which one soft member 40 having a high thermal conductivity is provided for each exothermic device, it is possible to employ the soft member 40 for a plurality of devices in common.

In the personal computer constructed as described above, outside air flows into the case 30 via the intake hole 8 and is exhausted out to the space downstream of the fan 4 by the fan 4. Part of the air flows between the electronic circuit board 2 and the electronic circuit board 3 and the remaining air flows between the electronic circuit board 2 and the bottom wall 30a of the case, as indicated by arrow 25b. When the bottom wall 30a of the case or the whole case is made of a metallic material, such as a magnesium alloy or an aluminum alloy, the wall 30a itself acts as a heat radiating fin, or a wide area formed at the wall 30a may be utilized as a heat radiating face, so that a high heat radiating performance may be obtained. Then, the cooling air is discharged from the exhaust hole 9 common to the second spaces divided by the electronic circuit board 2.

In the example shown in FIG. 8, the electronic circuit board 2 is installed so that the face thereof on which the high-exothermic device 1a is mounted faces in the direction opposite from that of the embodiment shown in FIG. 7 and a soft member 40 having a high thermal conductivity is interposed between the electronic circuit board 2 and the wall face of the bottom 30a of the case. Because part of the heat maybe radiated directly to the outside through the case wall, similarly to the case shown in FIG. 7, a higher cooling performance can be obtained.

Figure 9:
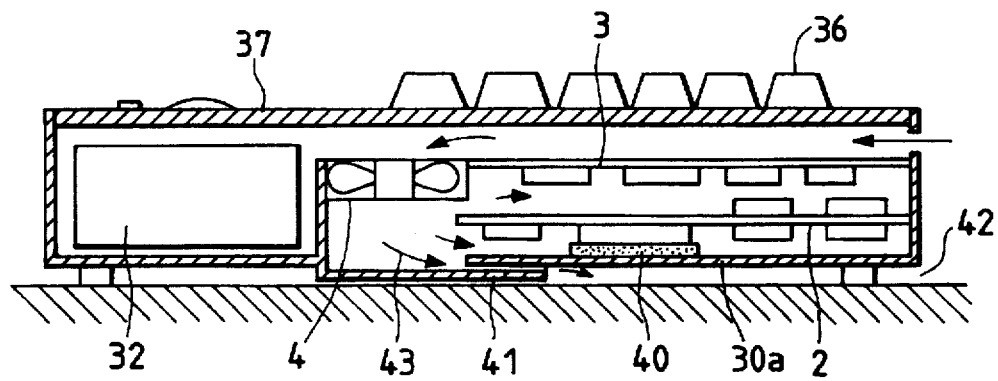
FIG. 9 is a longitudinal sectional view of a personal computer according to another embodiment of the present invention.

A fourth embodiment of the present invention will be explained with reference to FIG. 9. FIG. 9 is a longitudinal sectional view of a personal computer according to the present embodiment. While the personal computer of the present embodiment is constructed in the same manner as that shown in FIG. 7, i.e. the electronic circuit board 2 is installed so that the face thereof on which the high-exothermic device 1a is mounted faces the bottom 30a of the case and a soft member 40 having a high thermal conductivity is interposed between the high-exothermic device 1a and the wall of the bottom of the case, an opening 43 of the case is provided in the vicinity of the case wall where the thermally-conductive member is interposed and a guide plate 41 is provided extending from the opening 43 to the outer surface of the case wall. Outside air flows into the case through the intake hole 8 and flows out to the space downstream of the fan 4 by the fan 4. Part of the air flows through the space between the electronic circuit boards 2 and 3 and the remaining air flows through a gap between the electronic circuit board 2 and the case wall 30a. Moreover, part of the air also flows through a gap between the bottom 30a of the case and a surface 42 of a desk, for example, on which the personal computer rests along the guide plate 41. At this time, when the bottom 30a or the whole case is made of a metal, such as a magnesium alloy or an aluminum alloy, the bottom wall 30a acts as a heat radiating fin and the air flows through both faces of the wall of the bottom 30a, so that a high heat radiating performance can be obtained and the temperature of the bottom of the case can be suppressed from rising.

Figure 10:
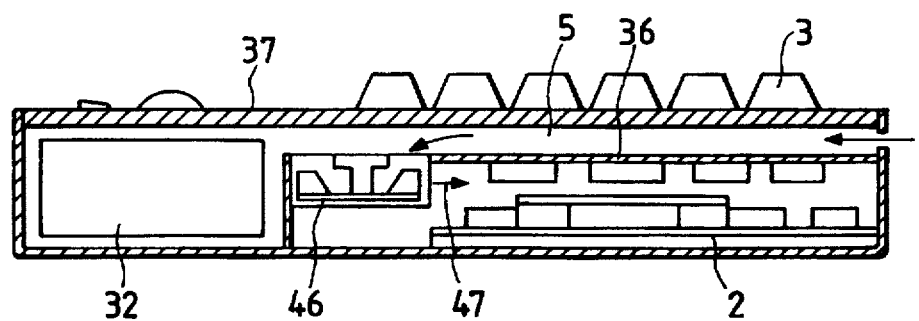
FIG. 10 is a longitudinal sectional view of a personal computer according to the present invention.
Figure 11:
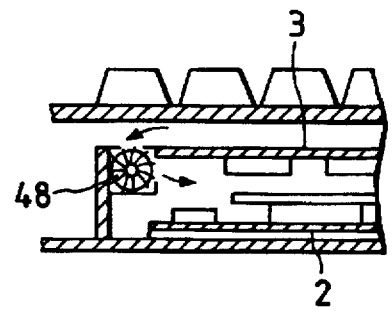
FIG. 11 is a longitudinal sectional view of a personal computer according to the present invention.

Although the fan 4 used in the embodiments described above is in the form of a propeller fan, it may take the form of a centrifugal fan or a cross-flow fan, as described below. FIG. 10 shows an example wherein a centrifugal fan 46 is used and FIG. 11 shows an example wherein a cross-flow fan 48 is used. When the centrifugal fan 46 is used as the fan 4, a high pressure is obtained in general as compared to the axial (propeller) fan when the aperture and the rotational speed are the same, and air can be blown out in the circumferential direction, as indicated by arrow 47, so that a pressure loss at the fan exhaust port can be reduced and the amount of air moved by the fan can be increased. As a result, the cooling performance is enhanced.

When the cross-flow fan 48 is provided as the fan 4 as shown in FIG. 11, it contributes to the miniaturization of the personal computer since it is thin and long and it can be installed in a narrow space.

As is apparent from the various embodiments described above, the present invention has an effect of giving no unpleasant feeling to the operator by suppressing the temperature of the members, such as the keyboard, which are touched by the operator, from rising in the personal computer.

While preferred embodiments have been described, variations thereto will occur to those skilled in the art within the scope of the present inventive concepts which are delineated by the following claims.

What is claimed is:

1. A personal computer comprising:

a case;

input means provided on a surface of said case;

electronic circuit boards on which a plurality of semiconductor devices are mounted and which are provided within said case so as to form in said case a first space partially defined by a back portion of said input means and a second space containing semiconductor devices to be cooled among said plurality of semiconductor devices;

an air intake hole formed in said case for communicating said first space with the outside of said case;

an exhaust hole formed in said case for communicating said second space with the outside of said case; and cooling means for causing air taken in from said intake hole to flow so that it is exhausted from said exhaust hole via said first and second spaces.

2. The personal computer according to claim 1, wherein said cooling means includes a fan provided between said first space and said second space to circulate air from said first space to said second space.

3. The personal computer according to claim 2, wherein said fan is an axial flow fan which is mounted so as to cause air flow from said first space to said second space.

4. The personal computer according to claim 3, further comprising a member for deflecting a flow of cooling air at the side of said fan from which air is blown out to said second space.

5. The personal computer according to claim 1, further comprising a member for regulating the flow of cooling air from said fan within said second space.

6. The personal computer according to claim 1, wherein said intake hole and said exhaust hole are provided at different faces of said case.

7. A personal computer comprising:

a case;

input means provided on a surface of said case an electronic circuit board on which a plurality of semiconductor devices are mounted and which is provided within said case so as to form in said case a first space created between a back portion of said input means and said electronic circuit board and a second space created between said electronic circuit board and a bottom of said case;

an air intake hole formed in said case for communicating said first space with the outside of said case;

an exhaust hole formed in said case for communicating said second space with the outside of said case; and cooling means for causing air taken in from said intake hole to flow so that it is exhausted from said exhaust hole via said first and second spaces.

8. The personal computer according to claim 7, wherein said cooling means is a fan provided between said first space and said second space to circulate air from said first space to said second space.

9. The personal computer according to claim 8, wherein said fan is an axial flow fan which is mounted so as to cause air flow from said first space to said second space.

10. The personal computer according to claim 9, further comprising a member for deflecting a flow of cooling air at the side of said fan from which air is blown out to said second space.

11. The personal computer according to claim 7, further comprising a member for regulating the flow of cooling air from said fan within said second space.

12. The personal computer according to claim 7, wherein said intake hole and said exhaust hole are provided at different faces of said case.

13. A personal computer comprising:

a case;

input means provided on a surface of said case;

at least two electronic circuit boards on which a plurality of semiconductor devices are mounted and which are provided within said case so as to form in said case a first space created between a back portion of said input means and a back of one electronic circuit board on which semiconductor devices are mounted and a second spaces created between the face of said one electronic circuit board on which semiconductor devices are mounted and said bottom of said case and between the other electronic circuit board;

an air intake hole formed in said case for communicating said first space with the outside of said case;

an exhaust hole formed in said case for communicating said second space with the outside of said case; and cooling means for causing air taken in from said intake hole to flow so that it is exhausted from said exhaust hole via said first and second spaces.

14. The personal computer according to claim 13, wherein said cooling means is a fan provided between said first space and said second space to circulate air from said first space to said second space.

15. The personal computer according to claim 14, wherein said fan is an axial flow fan which is mounted so as to cause air flow from said first space to said second space.

16. The personal computer according to claim 15, further comprising a member for deflecting a flow of cooling air at the side of said fan from which air is blown out to said second space.

17. The personal computer according to claim 13, further comprising a member for regulating the flow of cooling air from said fan within said second space.

18. The personal computer according to claim 13, wherein a weather-strip is provided between the upstream side of said other electronic circuit board and said bottom of the case.

19. The personal computer according to claim 13, further comprising a third space created between the bottom of said case and said other electronic circuit board and an exhaust hole formed in said case for communicating said third space with the outside of said case.

20. The personal computer according to claim 13, wherein said intake hole and said exhaust hole are provided at different faces of said case.

21. A personal computer comprising a case, an input means provided on a surface of said case, and electric circuit boards on which a plurality of semiconductor device are mounted, said case including a first space at least partially delimited by a back portion of said input means, a second space containing said electric circuit boards, and a cooling device provided between said first space and said second space to circulate air in both said first and second spaces.

* * * * *